Figure 1:
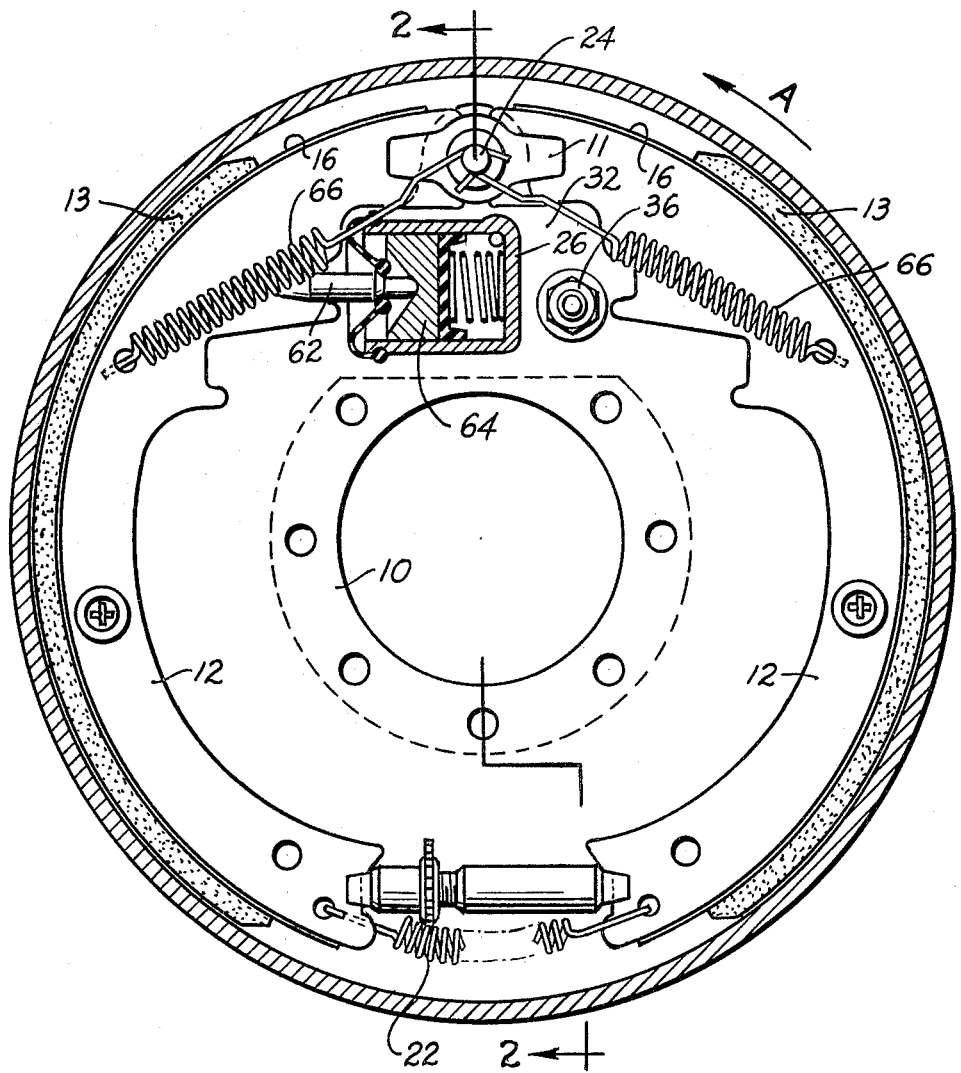

Aug. 9, 1966  E. K. DOMBECK  3,265,164
DUAL CYLINDER BRAKE

Original Filed Oct. 27, 1964  2 Sheets-Sheet 1

INVENTOR.
EDWARD K. DOMBECK.
BY
*Sheldon F. Raizes*
ATTORNEY.

Aug. 9, 1966 E. K. DOMBECK 3,265,164
DUAL CYLINDER BRAKE
Original Filed Oct. 27, 1964 2 Sheets-Sheet 2
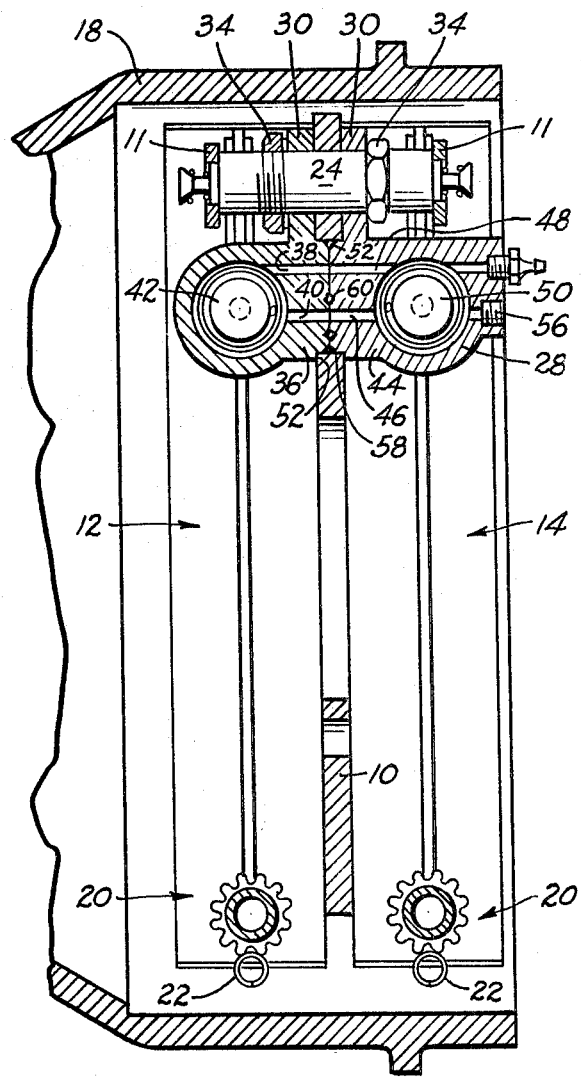
FIG_2
INVENTOR.
EDWARD K. DOMBECK.
BY
*Sheldon F. Raizes*
ATTORNEY.

3,265,164
DUAL CYLINDER BRAKE

Edward K. Dombeck, South Bend, Ind., assignor to The Bendix Corporation, South Bend, Ind., a corporation of Delaware Original application Oct. 27, 1964, Ser. No. 406,929. Divided and this application Oct. 6, 1965, Ser. No. 493,329

2 Claims. (Cl. 188—152)

This application is a division of my copending application Serial No. 406,929, filed on October 27, 1964, which in turn is a continuation-in-part of application Serial No. 210,768 (now abandoned).

This invention relates to a drum brake and more particularly to a drum brake for use on a vehicle having a small wheel base diameter and requiring a large braking force for stopping the vehicle.

One of the objects of this invention is to provide a brake having a set of brake shoes slidably mounted on each side of a backing plate.

Another object of this invention is to provide a brake with a wheel cylinder mounted on each face of a backing plate wherein the fluid chambers of each wheel cylinder are interconnected with each other.

A still further object of the invention is to accomplish the above objects with the utilization of as many standard parts as possible.

Other objects and features of the invention will become apparent from a consideration of the following description wherein a selected example embodiment has been chosen to illustrate the invention. The description proceeds with a reference to the accompanying drawing wherein:

FIGURE 1 illustrates a front elevational view of a brake assembly of the invention; and FIGURE 2 is a view taken along section line 2—2 of FIGURE 1.

Referring to FIGURES 1 and 2, a backing plate 10 is provided which may be attached to a stationary part of a vehicle, for instance, a spindle (not shown). A pair of T-shaped brake shoes 12, 12a are slidably mounted on one face of the backing plate 10 and a pair of brake shoes 14, 14a are slidably mounted on the other face of the backing plate 10 and are located directly behind the first set of brake shoes. Each brake shoe has a friction lining 13 attached to their rims 16 for frictionally engaging a brake drum 18. An adjustable strut 20 is located between and interconnects one set of adjacent ends of the brake shoes of each set and a spring 22 holds the ends of the brake shoes in engagement with the adjustable strut 20. An anchor pin 24 is secured to the backing plate 10 and located between the other adjacent ends of each pair of brake shoes at each set for anchoring abutment thereof. A retainer plate 11 is provided to laterally locate the ends of each pair of brake shoes with respect to the anchor pin 24.

A wheel cylinder 26 is provided on one side of the backing plate for actuating the set of brake shoes 12, 12a and a wheel cylinder 28 is provided on the other face of the backing plate for actuating the other set of brake shoes 14, 14a. Each wheel cylinder has an ear 30 and flange 32 each having an opening therein. The anchor pin 24 extends through the opening of the ears 30 with the nuts 34 pressing the ears into engagement with a backing plate. A bolt and nut assembly 36 extends through the openings in the flanges 32 for pressing the flanges into engagement with the backing plate thereby resulting in fixing the wheel cylinders to the backing plate. The wheel cylinder 26 has a boss 37 extending therefrom which has an inlet port 38 and an outlet port 40 communicating with the wheel cylinder fluid chamber 42. The wheel cylinder 28 has a boss 44 extending therefrom having an inlet port 46 and an outlet port 48 communicating with the fluid chamber 50. Each boss has a flange 52 for engaging the backing plate surfaces or faces. The wheel cylinder 28 further has an inlet port 54, communicating with a master cylinder, and a bleeder port 56. The backing plate has an opening 58 into which each boss 36 and 44 extend. The extent to which the bosses may be placed into the opening 58 is limited by engagement of the ear 30 and the flanges 52 on the backing plate faces. The inlet port 38 and outlet port 48 are aligned and the inlet port 46 and the outlet port 40 are aligned. Each boss has aligned annular notches which receive an O-ring 60 for separating the aligned ports 46 and 40 from the other aligned ports 38 and 48 and each boss has a shoulder therein which forms an annular notch when the bosses abut each other for receiving another O-ring 53 which separates the aligned ports from the exterior of the wheel cylinders. Thus, it can be seen the fluid communicated to the inlet nozzle 54 will travel to each fluid chamber 42 and 50 and when it is desired to bleed the wheel cylinder fluid chambers, the fluid will pass through ports 40 and 46 and bleed port 56.

A thrust element 62 of each respective wheel cylinder interconnects a piston 64 with the brake shoe 12 of one set of brake shoes and the brake shoe 14 of the other set of brake shoes. Assuming rotation of the brake drum in the direction of the arrow A, the brake shoes 12 and 14 will be the leading brake shoes and the brake shoes 12a and 14a will be the trailing brake shoes. Upon actuation of the wheel cylinders the thrust element 62 will thrust the brake lining 13 of the brake shoes 12 and 14 against the brake drum surface and upon engagement of the friction linings with the brake drum the shoes 12 and 14 will tend to rotate the brake drum thereby transferring their movement to the brake shoes 12a and 14a through the struts 20 effecting engagement of the linings of shoes 12a and 14a with the drum 14. Upon release of the pressure in the wheel cylinders, springs 66 will urge the brake shoes to retracted position. While a wheel cylinder having one piston for spreading only one shoe has been illustrated, obviously an opposed piston wheel cylinder for spreading both shoes of a set may be utilized.

The embodiment of the invention has been chosen for purposes of illustration, and it will be understood that it is in no way restrictive of the invention. It is reasonably to be expected that those skilled in the art may make numerous adaptations and revisions of the invention without departing from the spirit and scope of the invention and therefore it is intended that such revisions and variations as incorporate the herein disclosed principles, will be included within the following claims as equivalents thereof.

I claim:

1. In a drum brake comprising: a backing plate having an opening therein, a pair of wheel cylinders each having a boss thereon, each boss having an inlet and outlet port communicating with its respective wheel cylinder fluid chamber, one of said wheel cylinders having a hose inlet port and a bleeder port communicating with its respective wheel cylinder fluid chamber, means connecting said wheel cylinders to said backing plate, said wheel cylinders being arranged on said backing plate with the boss of each extending into said opening and abutting each other, the inlet port of one boss being generally aligned with the outlet port of the other boss and the outlet port of said one boss being generally aligned with the inlet port of said other boss, a pair of annular sealing members, a pair of annular aligned depressions one on each of the abutting surfaces defining an annular space therebetween surrounding one of said openings on each boss, one of said sealing members being received within said space formed by said aligned depressions, a pair of annular shoulders one on each of said bosses cooperating to define an annular recess receiving the other of said sealing members, said second sealing member engaging the wall of said backing plate opening and compressed between the wall and said shoulders whereby one pair of aligned ports is separated from the other pair of aligned ports and said aligned ports are separated from the exterior of said wheel cylinders.

2. The structure as recited in claim 1 wherein said sealing members are a pair of O-rings.

References Cited by the Examiner

UNITED STATES PATENTS

| | | | |
|---|---|---|---|
| 2,382,927 | 8/1945 | Whitacre | 188—152 |
| 2,496,562 | 2/1950 | Schnell | 188—152 |

FOREIGN PATENTS

| | | |
|---|---|---|
| 788,586 | 1/1958 | Great Britain. |

MILTON BUCHLER, *Primary Examiner.*

G. E. A. HALVOSA, *Assistant Examiner.*